US012055490B2

(12) United States Patent
Simpson et al.

(10) Patent No.: US 12,055,490 B2
(45) Date of Patent: Aug. 6, 2024

(54) METHOD OF MEASURING DIFFUSION IN A MEDIUM

(71) Applicant: PURDUE RESEARCH FOUNDATION, West Lafayette, IN (US)

(72) Inventors: Garth Jason Simpson, West Lafayette, IN (US); Andreas C. Geiger, Columbia City, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 18/457,175

(22) Filed: Aug. 28, 2023

(65) Prior Publication Data

US 2023/0400410 A1  Dec. 14, 2023

Related U.S. Application Data

(63) Continuation of application No. 17/487,981, filed on Sep. 28, 2021, now Pat. No. 11,740,180.

(60) Provisional application No. 63/084,007, filed on Sep. 28, 2020.

(51) Int. Cl.
*G01N 21/64* (2006.01)
*G02B 21/16* (2006.01)
*G02B 21/36* (2006.01)

(52) U.S. Cl.
CPC ..... *G01N 21/6408* (2013.01); *G01N 21/6402* (2013.01); *G01N 21/6428* (2013.01); *G01N 21/6458* (2013.01); *G02B 21/16* (2013.01); *G02B 21/365* (2013.01); *G01N 2201/06113* (2013.01)

(58) Field of Classification Search
None
See application file for complete search history.

(56) References Cited

U.S. PATENT DOCUMENTS

| | | | | |
|---|---|---|---|---|
| 5,784,162 A * | 7/1998 | Cabib | ...................... | G01J 3/453 435/6.12 |
| 6,483,582 B2 * | 11/2002 | Modlin | .............. | G01N 21/6445 356/323 |
| 7,557,915 B2 * | 7/2009 | Maier | .................... | G01J 3/2823 356/307 |
| 7,907,769 B2 * | 3/2011 | Sammak | ................. | G06V 20/69 435/7.25 |
| 8,189,900 B2 * | 5/2012 | Sammak | ................. | G06V 20/69 435/7.25 |
| 8,809,809 B1 * | 8/2014 | Wu | ........................ | G02B 21/245 359/383 |
| 9,117,273 B2 * | 8/2015 | Sibarita | ................... | G01N 21/64 |
| 9,557,292 B2 * | 1/2017 | Mayer | .............. | G01N 27/44791 |
| 9,885,705 B2 * | 2/2018 | Garini | ................ | G01N 21/6408 |

(Continued)

*Primary Examiner* — David P Porta
*Assistant Examiner* — Djura Malevic
(74) *Attorney, Agent, or Firm* — Edmonds & Cmaidalka, P C.

(57) ABSTRACT

Methods for measuring diffusion in a medium. One method includes dissolving a fluorescent sample in a medium, imaging the fluorescent sample with a patterned illumination Fluorescence Recovery After Photobleaching (FRAP) technique, and analyzing a set of microscope images of the photobleached dissolved fluorescent sample with the patterned illumination using a Fourier Transform (FT) FRAP technique.

20 Claims, 4 Drawing Sheets

(56) References Cited

U.S. PATENT DOCUMENTS

| | | | |
|---|---|---|---|
| 9,921,161 B1* | 3/2018 | Feldkhun | G01N 21/6458 |
| 10,100,102 B2* | 10/2018 | Lai | A61P 37/00 |
| 10,247,672 B2* | 4/2019 | Betzig | G01N 21/6458 |
| 10,317,361 B2* | 6/2019 | Mayer | G01N 33/48721 |
| 10,436,915 B2* | 10/2019 | Teshigawara | G01T 1/20187 |
| 10,524,664 B2* | 1/2020 | Liu | A61B 5/145 |
| 10,721,441 B2* | 7/2020 | Betzig | H04N 7/18 |
| 10,914,930 B2* | 2/2021 | Peng | G02B 21/0032 |
| 11,585,755 B2* | 2/2023 | Kang | G01N 21/6458 |
| 2002/0030811 A1* | 3/2002 | Schindler | G01N 21/6452 |
| | | | 356/318 |
| 2004/0053337 A1* | 3/2004 | Yamazaki | C12Q 1/18 |
| | | | 435/7.1 |
| 2004/0071328 A1* | 4/2004 | Vaisberg | G01N 15/1433 |
| | | | 382/129 |
| 2008/0274905 A1* | 11/2008 | Greene | G01N 21/6428 |
| | | | 506/17 |
| 2009/0017449 A1* | 1/2009 | Van Oijen | G01N 33/56983 |
| | | | 435/5 |
| 2009/0290780 A1* | 11/2009 | Kottig | G01N 21/6408 |
| | | | 382/133 |
| 2011/0057121 A1* | 3/2011 | Yang | G01J 3/4406 |
| | | | 250/491.1 |
| 2012/0287244 A1* | 11/2012 | Bennett | G02B 21/16 |
| | | | 348/46 |
| 2013/0035567 A1* | 2/2013 | Strano | G01N 33/54373 |
| | | | 977/750 |
| 2013/0286179 A1* | 10/2013 | Markle | G01N 21/6458 |
| | | | 348/78 |
| 2013/0294645 A1* | 11/2013 | Sibarita | G06T 7/73 |
| | | | 382/103 |
| 2014/0246317 A1* | 9/2014 | Mayer | G01N 33/48721 |
| | | | 204/452 |
| 2014/0340482 A1* | 11/2014 | Kanarowski | G02B 21/16 |
| | | | 348/46 |
| 2015/0212308 A1* | 7/2015 | Sirat | G01N 21/6458 |
| | | | 250/459.1 |
| 2015/0284451 A1* | 10/2015 | Lai | C07K 16/1235 |
| | | | 435/7.92 |
| 2016/0195705 A1* | 7/2016 | Betzig | G02B 27/58 |
| | | | 348/79 |
| 2016/0238610 A1* | 8/2016 | Garini | G01N 21/6408 |
| 2016/0274107 A1* | 9/2016 | Cognet | G01N 33/566 |
| 2017/0138898 A1* | 5/2017 | Mayer | G01N 27/44791 |
| 2017/0322406 A1* | 11/2017 | Sirat | G01N 21/6458 |
| 2017/0336326 A1* | 11/2017 | Sirat | G02B 21/0076 |
| 2018/0059475 A1* | 3/2018 | Lee | G02B 5/188 |
| 2018/0106781 A1* | 4/2018 | Garini | G01N 15/1427 |
| 2018/0164205 A1* | 6/2018 | Edel | G01N 15/1023 |
| 2018/0275057 A1* | 9/2018 | Kolkowitz | G01R 33/032 |
| 2019/0023769 A1* | 1/2019 | Lai | A61P 31/22 |
| 2019/0323990 A1* | 10/2019 | Mayer | C12Q 1/6869 |
| 2021/0080472 A1* | 3/2021 | Linghu | G01N 33/6872 |
| 2021/0223174 A1* | 7/2021 | Kang | G02B 21/0076 |
| 2022/0018779 A1* | 1/2022 | Yao | G02B 21/367 |
| 2022/0099574 A1* | 3/2022 | Simpson | G02B 21/16 |
| 2022/0163440 A1* | 5/2022 | Pertsinidis | G01N 15/1468 |

\* cited by examiner

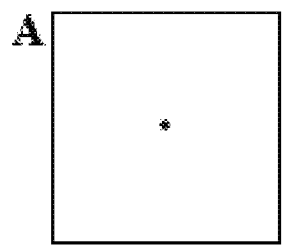
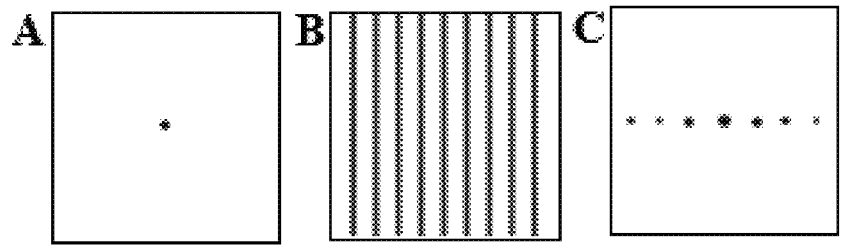
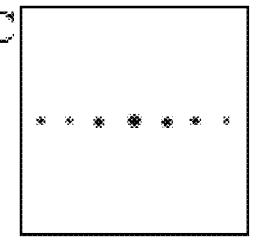
FIG. 1A  FIG. 1B  FIG. 1C
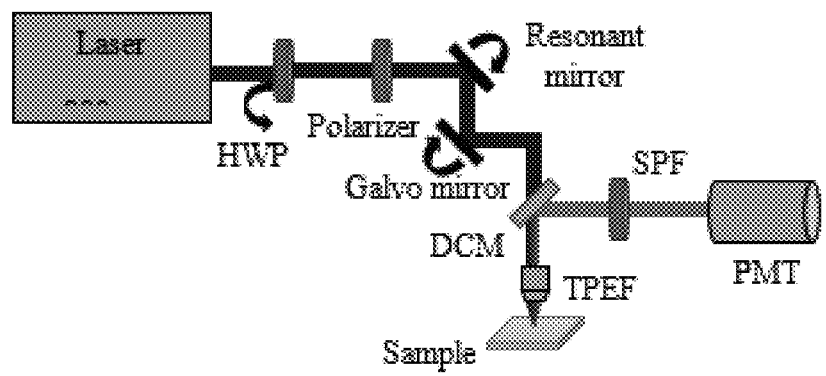
FIG. 2

METHOD OF MEASURING DIFFUSION IN A MEDIUM

CROSS REFERENCE TO RELATED APPLICATIONS

This application is a continuation of U.S. Pat. No. 17,487,981, filed on Sep. 28, 2021, now issued as U.S. Pat. No. 11,740,180, which claims priority to U.S. Provisional Application No. 63/084,007 filed on Sep. 28, 2020. All of which are incorporated by reference herein in their entireties.

GOVERNMENT LICENSE RIGHTS

This invention was made with government support under 1710475-CHE awarded by National Science Foundation. The government has certain rights in the invention.

BACKGROUND

Field

Embodiments provided herein relate to photon diffusion. More particularly, embodiments of the present disclosure relate to methods for analyzing photon diffusion and uses thereof.

Description of the Related Art

Fluorescence recovery after photobleaching ("FRAP") is a well-established and widely accessible method for probing diffusion. In FRAP, a region of a fluorescently-labeled sample is permanently photobleached using a short, high-intensity burst of light. After the photobleach, mobile fluorescent molecules diffuse into the region and mobile photobleached molecules diffuse out of the region. This combined mobility results in a time-dependent recovery of fluorescence intensity in the photobleached region. Diffusion information can be obtained by fitting the fluorescence recovery to a mathematical model.

The first FRAP experiment was performed by Peters et. al. in 1974 to measure the mobility of membrane proteins in red blood cell ghosts. More recently, FRAP has been used to probe epidermal growth factor receptor clustering in Chinese hamster ovary cell membranes, intercellular communication via septal junctions in multicellular cyanobacteria, and the dynamics of intermediate filament-like protein in the hyphae of Streptomyces venezuelae. FRAP has also been applied broadly in the pharmaceutical community to understand molecular transport in hydrogels and in extracellular matrices in an effort to improve drug delivery outcomes. Recent efforts have also been made to utilize FRAP as a pre-screening assay for in meso crystallization of membrane proteins in lipid cubic phase.

Despite the advantages of FRAP, quantitative diffusion analysis is typically complicated by the requirement for precise knowledge of the photobleaching profile. To support rapid diffusion measurements, FRAP is generally optimized for fast recovery by using a small photobleach spot. To compensate for low signal from a small photobleach spot, high photobleach depth is used to increase the signal-to-noise ratio ("SNR"). However, increasing the photobleach depth runs the risk of complicating reproducibility in the spatial photobleach profile by introducing nonlinearities from optical saturation and perturbations to diffusion from local heating. To address this issue, alternative photobleach patterns have been explored, most notably disc, line, and fringe pattern illumination. Disc illumination has the advantage of increasing the overall number of molecules photobleached, but largely negates the 1/f noise reductions from highly localized photobleaching and correspondingly fast recoveries. Line illumination is a reasonable compromise, supporting fast recovery in the direction orthogonal to the photobleach line and signal-to-noise averaging along the length of the line. With the possible exception of disc and fringe illumination, in which the contiguous photobleach spot is large relative to the optical point-spread function, the point and line photobleach patterns with the greatest reduction in 1/f noise are most prone to artifacts from ambiguities in the photobleach point spread function ("PSF").

Spatial Fourier analysis (SFA) is one of the more successful strategies used to date for addressing ambiguities in the PSF for point-excitation. In summary, diffusion in FRAP can be modeled as the convolution of the photobleach PSF with a time-varying Gaussian function. This convolution produces a function describing the real-space fluorescence recovery that is dependent on both time and the photobleach PSF. Moreover, this convolution generally produces a real-space recovery with no simple closed-form analytical solution, with a few notable exceptions for the photobleach PSF (e.g., Gaussian). However, in the Fourier transform domain, the convolution corresponds to a simple multiplication, disentangling the time-dependent decay from the photobleach profile. The decay curves for each spatial frequency in SFA can be used individually or collectively for recovering the diffusion coefficient. In this manner, the detailed functional form for the initial PSF becomes less critical in the analysis, as the fluorescence recovery is only dependent on time and not on the initial photobleach PSF for a single spatial frequency. For point-excitation, SFA suffers by distributing the signal power from sharp features in the real-space image out over many low-amplitude frequencies in the SFA image, but the intrinsic SNR can be recovered through simultaneous, collective analysis at multiple spatial frequencies. When one or a small number of frequencies are used, this distribution of power can result in a reduction in SNR, the cost of which represents a trade-off for the benefits in reducing ambiguities related to the PSF.

Prior to discussion of FT-FRAP with patterned illumination, it is useful to review conventional FRAP as a comparator within the FT framework. Fick's Law of Diffusion is given by the following general expression.

$$\frac{\partial}{\partial t} C(\rho, t) = \nabla D \nabla C(\rho, t) \tag{1}$$

In which $C(\rho,t)$ is the concentration of the analyte of interest as a function of position $\rho$ and time t, and D is the three-dimensional diffusion tensor.

This differential equation is arguably simpler to evaluate by first performing the spatial Fourier transform to generate $\tilde{C}(\overline{v},0)$, in which $\tilde{C}$ is the spatial Fourier transform of C and $\overline{v}$ is the 3D spatial wavevector. Upon Fourier transformation of the diffusion equation given in Eq. 1, each derivative transforms as multiplication by the "diagonal" function $i2\pi \overline{v}$ $$\frac{\partial}{\partial t} \tilde{C}(\overline{v}, t) = -4\pi^2 \overline{v}^T D \overline{v} \tilde{C}(\overline{v}, t) \tag{2}$$

Evaluation of $\bar{v}^T D \bar{v}$ considering diffusion just within the (x,y) plane yields the nonzero scalar products $\bar{v}_x^2 D_{xx} + 2\bar{v}_x \bar{v}_y D_{xy} + \bar{v}_y^2 D_{yy}$. For a choice of (x,y) coordinates defined along the principal moments of the diffusion tensor D (including the case of constant diffusion in all (x,y) directions), Dxy=0. In this case, the diffusion equation can be independently evaluated in each of the (x,y) directions. The expression for the x-direction is given below, with an analogous expression present for the y-direction.

$$\frac{\partial}{\partial t} \tilde{C}(\bar{v}_x, t) = -4\pi^2 \bar{v}_x^2 D_{xx} \tilde{C}(\bar{v}_x, t) \tag{3}$$

Since only $\tilde{C}(\bar{v}_x, t)$ in Eq. 3 depends on time, the expression in Eq. 3 is of the form f'(t)=kf(t), for which one general solution, subject to the constraint of a decay, is given by an exponential function of the form f(t)=f(0)ekt, with k<0.

$$\tilde{C}(\bar{v}_x, t) = \tilde{C}(\bar{v}_x, 0) e^{-4\pi^2 \bar{v}_x^2 D_{xx} t} \tag{4}$$

This solution to the differential equation along the x direction is a Gaussian function in $\bar{v}_x$. Multiplication by a Gaussian in the spatial Fourier domain corresponds to convolution with a Gaussian in real space.

$$C(x, t) = C(x, 0) \otimes \frac{1}{\sqrt{2\pi\sigma_t^2}} e^{-\frac{x^2}{2\sigma_t^2}}; \sigma_t^2 = 2D_{xx} t \tag{5}$$

The standard deviation of the spatial Gaussian distribution σt increases with the square root of time, corresponding to convolution with an ever-broadening Gaussian as diffusion proceeds.

In the limit of a thin sample, diffusion in the z-direction can be neglected, with diffusion expressed with respect to both x and y. Under these conditions in conventional FRAP (depicted in FIG. 1A), the photobleach pattern for a symmetric Gaussian illumination pattern on the back of an objective is also Gaussian within the field of view.

$$C(x, y, 0) = A(2\pi\sigma_b^2)^{-1} e^{-\frac{(x^2+y^2)}{2\sigma_b^2}} \tag{6}$$

In isotropic media, diffusion is identical in both the x and y coordinates, such that the diffusion tensor can be replaced by a single scalar diffusion coefficient D. In this limit, the convolution of two 2D Gaussian functions (one from the initial photobleach and one from diffusion) has the convenient property of producing yet another Gaussian function, the width of which evolves in time.

$$C(x, y, t) = A(2\pi\sigma_b^2)^{-1} e^{-\frac{(x^2+y^2)}{2\sigma_b^2}} \otimes (4\pi Dt)^{-1} e^{-\frac{(x^2+y^2)}{4Dt}} \tag{7}$$

Evaluation of the convolution results in the following expression for the time-dependence.

$$C(x, y, t) = A(2\pi\sigma_b^2 + 4\pi Dt)^{-1} e^{-\frac{(x^2+y^2)}{2\sigma_b^2 + 4Dt}} \tag{8}$$

If the system is anisotropic, selection of the principal spatial coordinates that diagonalize the diffusion matrix allows the diffusion equation to incorporate differences in diffusivity along different spatial dimensions.

$$C(x, y, t) = A(2\pi\sigma_b^2)^{-1} e^{-\frac{(x^2+y^2)}{2\sigma_b^2}} \otimes \left[ (4\pi D_{xx} t)^{-\frac{1}{2}} e^{-\frac{x^2}{4D_{xx} t}} (4\pi D_{yy} t)^{-\frac{1}{2}} e^{-\frac{y^2}{4D_{yy} t}} \right] \tag{9}$$

$$C(x, y, t) = A\left[ (2\pi\sigma_b^2 + 4\pi D_{xx} t)(2\pi\sigma_b^2 + 4\pi D_{yy} t) \right]^{-\frac{1}{2}} e^{-\frac{x^2}{2\sigma_b^2 + 4D_{xx} t} - \frac{y^2}{2\sigma_b^2 + 4D_{yy} t}} \tag{10}$$

In the more general case of a non-Gaussian function describing the photobleach pattern C(x,y,0), the situation is significantly more complex. In general, no simple analytical forms are expected for the convolution of a Gaussian with non-Gaussian functions, requiring numerical methods for approximations. Unfortunately, non-Gaussian photobleach patterns are commonplace. Even when Gaussian patterns are intended, photobleaching can often approach saturating conditions when the peak photobleach depth approaches unity, resulting in "top-hat" initial photobleach peak shapes. In such cases, the shape of the recovered region can be complicated to integrate analytically into the diffusion analysis for recovery of the diffusion coefficient.

Furthermore, point-bleach FRAP lacks sensitivity for characterizing anomalous diffusion. Diffusion is categorized as anomalous when it deviates from normal Brownian diffusion. Whereas the mean squared displacement ("MSD") in normal diffusion evolves with a linear dependence on time, the MSD in anomalous diffusion exhibits a nonlinear dependence on time, resulting in a time-varying/distance-dependent diffusion coefficient. Anomalous diffusion has been observed in a variety of systems, such as the cell and polymeric networks. Anomalous diffusion in point-bleach FRAP can be identified through a nonlinear fit of the fluorescence recovery to an anomalous diffusion model. However, the relatively subtle differences in the point-bleach recovery curves between normal and anomalous diffusion can complicate identification and quantification of deviations from normal diffusion. Further complications in accurately characterizing anomalous diffusion with point-bleach FRAP arise from the requirement for precise knowledge of the photobleaching PSF. In addition, significant covariance between fitting parameters can result in relatively large uncertainties in the recovered coefficients (e.g., the diffusion coefficient and an anomalous exponent).

Finally, point excitation poses particularly problematic practical challenges from local heating effects in multi-photon excited FRAP measurements. Because of the general inefficiency of multi-photon excitation, a large flux of light is typically introduced, only a small fraction of which contributes to excitation and fluorescence. Weak but nonzero absorption of the incident light and Stokes Raman transitions leading to local heat deposition both compete with multi-photon excitation. When the excitation beam is fixed at a single location, local temperatures can quickly escalate until the rate of heat dissipation matches the rate of deposition. Depending on the steady-state temperature differential, this transient temperature gradient can potentially bias subsequent diffusion measurements based on isothermal assumptions.

There is a need, therefore, for a method of quantitative diffusion analysis that minimizes ambiguities in the photobleach PSF, maintains high SNR, minimizes uncertainties in point-bleach recovery curves, and minimizes temperature differential bias in subsequent measurements.

SUMMARY

Embodiments of the present disclosure provide methods for measuring diffusion in a medium. In one particular embodiment, diffusion can be measured by dissolving a fluorescent sample in a medium, imaging the fluorescent sample with a patterned illumination Fluorescence Recovery After Photobleaching technique (FRAP), and analyzing a set of microscope images of the photobleached dissolved fluorescent sample with the patterned illumination using a Fourier Transform FRAP technique (FT-FRAP).

In at least one particular embodiment, imaging the fluorescent sample with the patterned illumination FRAP technique includes recording images of a dissolved fluorescent sample into the medium; photobleaching the dissolved fluorescent sample using a patterned illumination with a laser, wherein the patterned illumination comprises at least one of periodic patterned illumination or repeating patterned illumination; and recording images of a photobleached dissolved fluorescent sample with the patterned illumination.

A set of microscope images of the photobleached dissolved fluorescent sample can be analyzed with the patterned illumination using a Fourier Transform (FT) FRAP technique. Such analyzed set of microscope images of the photobleached dissolved fluorescent sample with the patterned illumination using the FT FRAP technique can be done by performing a two-dimensional spatial Fourier transform on the set of microscope images; fitting at least one Fourier transform peak to a diffusion model, thereby producing a fitted curve; and calculating diffusion properties of the fitted curve.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are, therefore, not to be considered limiting of its scope, for the invention may admit to other equally effective embodiments. It is emphasized that the figures are not necessarily to scale and certain features and certain views of the figures can be shown exaggerated in scale or in schematic for clarity and/or conciseness.

FIG. 1A depicts an illustrative schematic of a conventional point-bleach FRAP illumination.

FIG. 1B depicts an illustrative schematic of a patterned illumination with comb excitation, according to one or more embodiments provided herein.

FIG. 1C depicts an illustrative schematic of a spatial FT of the patterned illumination in FIG. 1B, according to one or more embodiments provided herein. As seen in FIG. 1A, conventional point-bleach FRAP produces a sharp point in real space, FT-FRAP with patterned illumination, as seen in FIG. 1C, produces sharp puncta in the spatial Fourier domain.

FIG. 2 depicts an illustrative schematic of a nonlinear-optical beam-scanning microscope used for multi-photon FT-FRAP, according to one or more embodiments provided herein.

FIG. 3A shows an image of the solution immediately after a 32-line comb bleach, according to one or more embodiments provided herein. FIG. 3B shows a 2D-FT with circled peaks corresponding to the first and second spatial frequency harmonics of the 32-line comb bleach depicted in FIG. 3A. FIG. 3C shows a fluorescence recovery of the first and second harmonic peaks with best-fit curves recovering a diffusion coefficient, D=3.70±0.02 $\mu m^2/s$, according to one or more embodiments provided herein. The reported uncertainty is the standard deviation of the fit.

FIG. 4A shows a real and imaginary amplitudes of 2D-FT fundamental and $2^{nd}$ harmonic peaks upon sample translation during diffusion. FIG. 4B shows a phase calculated from real and imaginary amplitudes of 2D-FT peaks. The non-translated sample has minimal bulk flow. The velocities calculated from the fundamental and $2^{nd}$ harmonic peaks of the translated sample are within one standard deviation of each other and close to the translation rate of the sample stage (4.0±0.4 $\mu m/s$) after correcting for bulk flow from convection. The reported uncertainties are the standard deviation of the fit.

DETAILED DESCRIPTION

Figure 3:
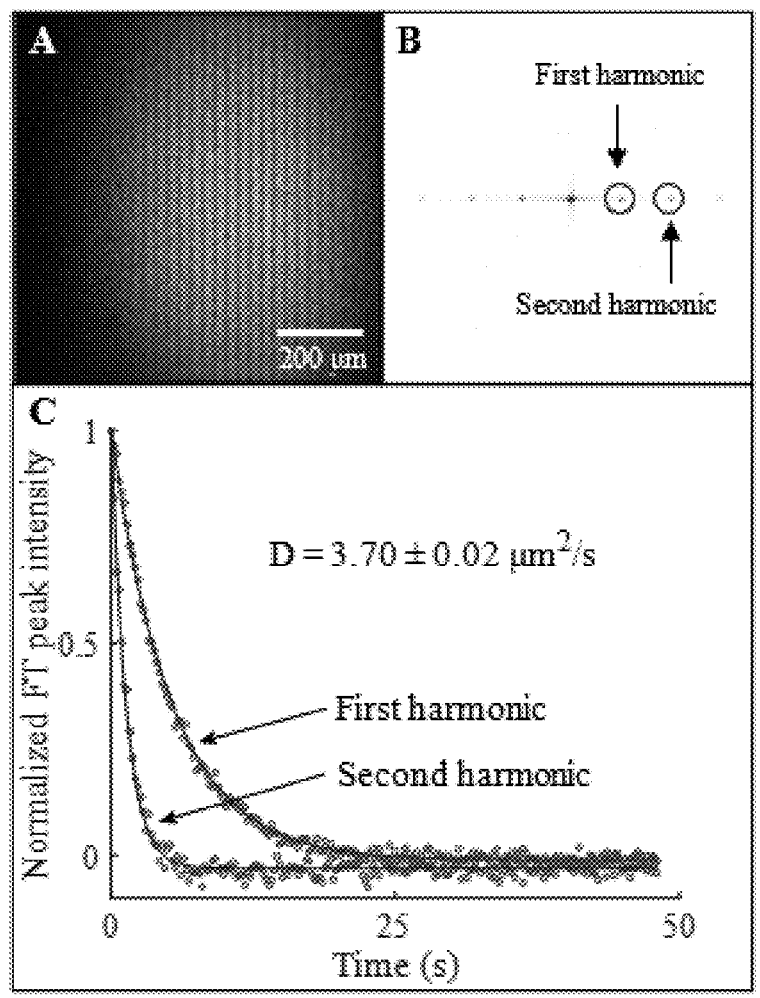
FIGS. 3A, 3B and 3C depict a multiphoton excited FT-FRAP with comb photobleach of FITC-polydextran (2 MDa) dissolved in 50/50 glycerol/water, according to one or more embodiments provided herein.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Furthermore, in the following discussion and in the claims, the terms "including" and "comprising" are used in an open-ended fashion, and thus should be interpreted to mean "including, but not limited to." The phrase "consisting essentially of" means that the described/claimed composition does not include any other components that will materially alter its properties by any more than 5% of that property, and in any case does not include any other component to a level greater than 3 mass %.

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "an olefin" include embodiments where one, two, or more olefins are used, unless specified to the contrary or the context clearly indicates that only one olefin is used.

Unless otherwise indicated herein, all numerical values are "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Each of the appended claims defines a separate invention, which for infringement purposes is recognized as including equivalents to the various elements or limitations specified in the claims. Depending on the context, all references to the "invention" may in some cases refer to certain specific embodiments. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

Embodiments of the present disclosure provide methods for measuring diffusion in a medium. In one particular embodiment, diffusion can be measured by dissolving a fluorescent sample in a medium, imaging the fluorescent sample with a patterned illumination Fluorescence Recovery After Photobleaching technique (FRAP), and analyzing a set of microscope images of the photobleached dissolved fluorescent sample with the patterned illumination using a Fourier Transform FRAP technique (FT-FRAP). Fourier transform fluorescence recovery after photobleaching (FT-FRAP) with patterned illumination is theorized and demonstrated for quantitatively evaluating normal and anomalous diffusion. Diffusion characterization is routinely performed to assess mobility in cell biology, pharmacology, and food science. Conventional FRAP is noninvasive, has low sample volume requirements, and can rapidly measure diffusion over distances of a few micrometers. However, conventional point-bleach measurements are complicated by signal-to-noise limitations, the need for precise knowledge of the photobleach beam profile, potential for bias due to sample heterogeneity, and poor compatibility with multi-photon excitation due to local heating. In FT-FRAP with patterned illumination, the time-dependent fluorescence recovery signal is concentrated to puncta in the spatial Fourier domain through patterned photobleaching, with substantial improvements in signal-to-noise, mathematical simplicity, representative sampling, and multiphoton compatibility. A custom nonlinear-optical beam-scanning microscope enabled patterned illumination for photobleaching through two-photon excitation. Measurements in the spatial Fourier domain removed dependence on the photobleach profile, suppressing bias from imprecise knowledge of the point spread function. For normal diffusion, the fluorescence recovery produced a simple single-exponential decay in the spatial Fourier domain, in excellent agreement with theoretical predictions. Simultaneous measurement of diffusion at multiple length scales was enabled through analysis of multiple spatial harmonics of the photobleaching pattern. Anomalous diffusion was characterized by FT-FRAP through a nonlinear fit to multiple spatial harmonics of the fluorescence recovery. Constraining the fit to describe diffusion over multiple length scales resulted in higher confidence in the recovered fitting parameters. Additionally, phase analysis in FT-FRAP was shown to inform on flow/sample translation.

Fourier transform fluorescence recovery after photobleaching (FT-FRAP) with patterned illumination greatly improves the accuracy of diffusion assessments and simultaneously accesses information on both normal and anomalous diffusion in a single experiment. In this work, comb patterns for illumination during photobleaching were demonstrated to support high SNR measurements of normal and anomalous diffusion in Fourier transform analysis of fluorescence recovery with multi-photon excitation. In brief, photobleach patterns were selected to concentrate signal to puncta in the spatial Fourier transform domain, rather than a point in the real-space image (FIG. 1A). Patterned illumination using rapid line-scanning distributed the power from the photobleach over much larger regions in the field of view, removing many of the potential nonlinearities and biases associated with highly localized excitation while enabling multi-photon excitation with negligible artifacts from local heating. Probing diffusion at multiple length scales by interrogating multiple harmonics in the spatial frequency domain was shown to increase confidence in recovered fitting parameters in analysis of anomalous diffusion. The theoretical foundation for Fourier-transform fluorescence recovery after photobleaching (FT-FRAP) with patterned illumination is evaluated in proof-of-concept studies of model systems for characterizing normal and anomalous diffusion.

In FT-FRAP, the initial photobleach pattern is selected to produce sharp puncta in the spatial frequency domain, rather than in real-space. One such pattern is a comb, or a periodic series of lines. For mathematical purposes, we will define the comb pattern to proceed along the x-axis in the laboratory frame with constant illumination along the y-axis, producing a series of photobleached stripes (depicted in FIG. 1B). The initial photobleach pattern $C(x,0)$ is constant in the y-axis and given below, in which $\delta_{x,\pm n/(2\pi \bar{v}_x^0)}$ is a delta function at the positions $\pm n\bar{v}_x^0$ and $n \in \{0, 1, 2, \ldots\}$, C0 is the initial concentration of the analyte of interest, and A is the photobleach depth.

$$C(x, 0) = C_0 \left[ 1 - A \sum_{n=0,1,2...} \left( \delta_{x, \pm n/(2\pi\bar{v}_x^0)} \otimes PSF(x) \right) \right] \quad (11)$$

By taking the spatial Fourier transform of this equation, the convolution of the photobleach $PSF(x)$ with the comb pattern $\delta_{x, \pm n/(2\pi\bar{v}_x^0)}$ is replaced by a multiplication operation, simplifying the analysis. The initial (t=0) spatial Fourier transform of $C(x,0)$ along the x-direction is then given by the following expression, in which $\Phi_{PSF}(\bar{v}_x)$ is the spatial Fourier transform of $PSF(x)$.

$$\tilde{C}(\bar{v}_x, 0) = C_0 \left[ \delta_{\bar{v}_x,0} - A \sum_{n=0,1,2...} \delta_{\bar{v}_x, \pm n\bar{v}_x^0} \Phi_{PSF}(\bar{v}_x) \right] \quad (12)$$

$$\tilde{C}(\bar{v}_x, 0) = C_0 \delta_{\bar{v}_x,0} - C_0 A \sum_{n=1,2...} \delta_{\bar{v}_x, \pm n\bar{v}_x^0} \Phi_{PSF,x}(\pm n\bar{v}_x^0) \quad (13)$$

In brief, the initial photobleach corresponds to a series of puncta in the spatial Fourier domain positioned at $(\bar{v}x, \bar{v}y) = \pm n\bar{v}_x^0, 0)$, each of which is scaled in initial amplitude by the spatial Fourier transform of $PSF(x)$, with additional amplitude at the origin $(\bar{v}_x, \bar{v}_y) = (0,0)$ from the overall average fluorescence intensity.

The time-dependent behavior of each point in the FT can be evaluated by an approach analogous to that illustrated in Eq. 4 for the nth harmonic (n>0).

$$\tilde{C}_n(\bar{v}_x, t) = \tilde{C}(\pm n\bar{v}_x^0, 0) e^{-4\pi^2 (n\bar{v}_x^0)^2 D_{xx} t}; \quad (14)$$

$$\tilde{C}_n(\pm n\bar{v}_x^0, 0) = -C_0 A \Phi_{PSF,x}(\pm n\bar{v}_x^0)$$

For a given impulse in the FT image a single-exponential decay is expected irrespective of the functional form for $PSF(x)$. The time-constant is given by $\tau = [(2\pi n\bar{v}_x^0)^2 D_{xx}]^{-1}$. This single-exponential recovery is in stark contrast to conventional FRAP analysis based on measurements performed in real-space, for which the time scale for recovery depends sensitively on precise foreknowledge of $PSF(x)$ for recovery of the diffusion coefficient. The time-constant of the fluorescence recovery in FT-FRAP is independent of $PSF(x)$, which allows for simplified mathematical recovery of Dxx while circumventing error associated with imprecise estimates of $PSF(x)$.

Through this analysis, comb photobleaching has the additional practical advantage of simultaneously enabling diffusion analysis over multiple length scales. For example, the fourth harmonic will probe diffusion over a length 4-fold shorter than the first harmonic, and by nature of the quadratic dependence on spatial frequency, the fourth harmonic will recover 16-fold faster than the first harmonic for normal diffusion. This disparity enables analyses of both normal and anomalous diffusion without the need for changing instrument settings.

Anomalous Diffusion

The capability of FT-FRAP to simultaneously measure diffusion over multiple length scales enables quantitative analysis of anomalous diffusion. While normal diffusion is characterized by fluorescence recovery with a quadratic dependence on spatial frequency, anomalous diffusion will produce fluorescence recovery that deviates from a quadratic dependence. The ability to simultaneously interrogate diffusion over several discrete, well-defined distances by FT-FRAP with comb illumination provides a convenient route for quantifying anomalous diffusion, if present.

Numerous mathematical models for anomalous diffusion can be found for trends anticipated under a diverse suite of conditions. A model based on continuous-time random walk and fractional diffusion is considered in this work because of its general applicability to systems with both time-varying and distance-dependent diffusion. In a continuous-time random walk model, diffusion is approximated as a series of random steps. Normal diffusion is characterized by a Gaussian pdf in step lengths (variance=$2\sigma^2$) and a Poisson pdf in wait times between steps (characteristic wait time=t). Deviation from normal Brownian diffusion can arise from various sources, two of which we will consider in the anomalous diffusion model used in this work. First, anomalous diffusion can arise when the characteristic wait time, $\tau$ diverges. When $\tau$ is finite, as in normal diffusion, the MSD exhibits a linear time dependence. When the distribution of wait times diverges due to binding or association, the time dependence of the MSD deviates from linear and scales with time to the power $\alpha$.

$$\langle x^2 \rangle \Box t^\alpha \quad (15)$$

Normal diffusion corresponds to $\alpha=1$, subdiffusion corresponds to $0<\alpha<1$, and superdiffusion corresponds to $\alpha>1$. The fluorescence recovery in this class of anomalous diffusion is modeled as a one-parameter Mittag-Leffler function $E\alpha$.

$$\tilde{C}n(\bar{v}x,t) = \tilde{C}(\pm n\bar{v}_x^0, 0) E_\alpha(-4\pi^2 (n\bar{v}_x^0)^2 D_{xx} t^\alpha, \alpha) \quad (16)$$

The Mittag-Leffler function is a fractional generalization of an exponential function. The one-parameter Mittag-Leffler, $E_\alpha(z,\alpha)$ converges to an exponential $E_1(z,1)=e^z$ for $\alpha=1$, and $$E_0(z, 0) = \frac{1}{1-z}$$

for $\alpha=0$.

A second source of anomalous diffusion is a deviation in the step-length distribution. Normal diffusion exhibits a Gaussian step-length pdf with a variance of $2\sigma^2$, leading to a quadratic dependence of the diffusion coefficient on spatial frequency. However, in cases where the variance in the step-length distribution diverges, Lévy-flight behavior is observed, and the anomalous diffusion coefficient will adopt a dependence on $\sigma\mu$ instead of $\sigma^2$ for normal diffusion.

$$D_{xx} \equiv \sigma\mu/\tau \quad (17)$$

Lévy-flight diffusion produces a stretched exponential decay in the spatial frequency domain, where the spatial frequency is raised to the power $\mu$ rather than 2 for normal diffusion.

$$\tilde{C}n(\bar{v}x,t) = \tilde{C}(\pm n\bar{v}_x^0, 0) e^{-(2\pi n\bar{v}_x^0)^\mu D_{xx} t} \quad (18)$$

A system can exhibit both subdiffusive and Levy-flight behavior when both $\tau$ and $\sigma$ diverge. An equation describing such as system results from modification of the Mittag-Leffler function shown in Eq. 16 by replacing the quadratic dependence on the spatial frequency term with the exponent $\mu$ and by scaling the exponent of t by $2/\mu$.

$$\tilde{C}_n(\bar{v}_x,t) = \tilde{C}(\pm n\bar{v}_x^0, 0) E_\alpha(-(2\pi n\bar{v}_x^0)^\mu D_{xx} t^{2\alpha/\mu}, \alpha) \quad (19)$$

FT-FRAP is capable of sensitively characterizing anomalous diffusion because it can measure diffusion on multiple length scales. A fit to Eq. 19 involves parameters that are likely to have high covariance if the fit is performed with only one recovery curve. By performing a global fit with multiple recovery curves at multiple length scales, the fit can be constrained to recover more accurate values for the parameters describing anomalous diffusion.

Signal Power

In comparison to analysis in real space, the Fourier domain analysis with patterned illumination provides a substantial advantage in terms of the available power of the detected signal. Power is conserved upon Fourier transformation, allowing direct comparisons across both representations. For a Gaussian photobleach spot with a width parameter σ, and peak photobleach depth Ap, the power is generated by integration over the 2D Gaussian.

$$P_{Gaussian} = \int_0^{512} \int_0^{512} \left[ C_0 A_p e^{-\frac{[(x-x_0)^2 + (y-y_0)^2]}{2\sigma^2}} \right]^2 dx dy \quad (20)$$

In a typical experiment, the Gaussian width is much smaller than the field of view in order to reduce measurement times by minimizing the diffusion length. In the limit that σ<<512 pixels (assuming a field of view of 512×512 pixels), the discrete limits of integration can be safely evaluated as ±∞. The integrals can be further simplified by substituting x'=x−x0 and noting that dx=dx' (with analogous substitutions for y).

$$P_{Gaussian} \cong (C_0 A_p)^2 \int_{-\infty}^{\infty} e^{-\frac{x'^2}{\sigma^2}} dx' \int_{-\infty}^{\infty} e^{-\frac{y'^2}{\sigma^2}} dy' \cong \pi\sigma^2 (C_0 A_p)^2 \quad (21)$$

The power in the impulse in the FT image produced by comb illumination can be similarly calculated by evaluating the same power through integration of the real-space photobleach pattern. For a photobleach depth Ap, the power in a comb with N lines is given by the following expression.

$$P_{comb} = \int_0^{512} \int_0^{512} \left[ \sum_{n=1}^{N} \left( C_0 A_p \delta_{x, \pm n x \bar{v}_x^0} \otimes PSF(x) \right) \right]^2 dx dy \cong (C_0 A_p)^2 (512) \quad (22)$$

$$\sum_{n=1}^{N} \int_{-\infty}^{\infty} |PSF(x)|^2 dx \cong (C_0 A_p)^2 (512) N \sqrt{\pi\sigma^2} = P_{Gaussian} \times \frac{512 N}{\sqrt{\pi\sigma^2}}$$

The power advantage for comb excitation with a beam PSF with a characteristic width of 2 pixels relative to point excitation is ~2,300-fold greater than that in the Gaussian photobleach spot with an identical photobleach depth and 32 lines in the comb. This potential for signal-to-noise enhancement is particularly noteworthy since the peak photobleach amplitude Ap is bounded to be less than unity and is typically much less than 0.5 to reduce nonlinear effects from saturation and local heating. It is worth emphasizing that this signal increase represents the theoretical upper limit corresponding to a 2,300-fold increase in the total power used for illuminating the sample. In practice, local heating and/or the availability of laser power may limit the practical advantages accessible experimentally. Fortunately, distribution of the power over the entire field of view should reduce perturbations associated with heating effects. Furthermore, advances in laser technology are increasing the availability of high-power CW lasers compatible with many photobleaching experiments.

In addition to the power advantage, FT-FRAP with a comb photobleach pattern provides an anticipated intrinsic signal-to-noise advantage through Fourier-domain analysis. White noise is uniformly distributed in both space and spatial frequency. Localized detection in the Fourier domain that changes in amplitude but not shape maintains fixed noise contributions in spatial frequency. In contrast, the spread in the photobleach over time increases the noise contributions over which the signal is integrated. A more detailed comparison of the SNR for fixed bleach power is provided in the Supplemental Information.

Phasor Analysis of Flow in FT-FRAP

The preceding description is based on the assumption of even functions for the comb photobleach pattern relative to the origin of the image (typically, the center). Even assuming the initial photobleach pattern is symmetric about the origin, directional flow within the sample could result in displacements along the flow direction (assumed to be x for simplicity) over time. Displacements in real space correspond to shifts in phase in the Fourier domain, such that phase analysis in the FT domain has the potential to inform on flow. Considering comb excitation, a shift of Δx in the initial photobleach pattern will produce shifts in the δ-functions associated with the comb.

$$C(x, 0) = C_0 \left[ 1 - A \sum_{n=0,1,2...} (\delta(\Delta x) \otimes PSF(x)) \right] \quad (23)$$

In which $\delta(\Delta x) = \delta_{x, \pm n(x + \Delta x)\bar{v}_x^0}$. The influence of displacement is easily integrated into the FT analysis using the shift theorem, in which displacement by an offset from the origin of Δx is accounted for in the spatial FT through multiplication by $e^{i2\pi \bar{v} \Delta x}$ for a given value of n.(42)

$$\tilde{C}_n(\bar{v}_x, t) = \tilde{C}(\pm n \bar{v}_x^0, 0) e^{-4\pi^2 (n \bar{v}_x^0)^2 D_{xx} t} e^{i2\pi (n \bar{v}_x^0) \Delta x} \quad (24)$$

At t=0, the initial phase angle of the nth reflection is related to the argument $\varphi_n$ of $\tilde{C}_n(\bar{v}_x, 0)$, which is simply $\varphi_n = 2\pi n \bar{v}_x^0 \Delta x$. In the absence of time-averaged flow in the x-direction, the argument of the nth reflection will be preserved throughout the experiment. If flow is nonzero, then Δx is a function of time. Assuming a constant flow rate of qx=Δx/t, then Δx can be replaced by qxt+Δx0 in Eq. 24, in which Δx0 is the phase shift at t=0. This substitution results in an argument for the nth peak given by the following equation.

$$\varphi_n = 2\pi n \bar{v}_x^0 (\Delta x_0 + q_x t) \quad (25)$$

Notably, the rate of change in the phase shift from flow is proportional to n, such that the higher harmonics corresponding to higher spatial frequencies are likely to be more sensitive to flow than the lower harmonics. This trend mirrors analogous sensitivities to time in the fluorescence recovery from diffusion in which the higher harmonics report on fast diffusion times measured over short distances.

EXAMPLES

The foregoing discussion can be further described with reference to the following non-limiting examples.

Two-photon excitation in FT-FRAP was evaluated in more detail. The experimental apparatus used for the two-photon excitation in FT-FRAP is shown in FIG. 2, which depicts an illustrative schematic of a nonlinear-optical beam-scanning microscope used for multi-photon FT-FRAP. A HWP on a flip mount was used to modulate from low power (~50 mW) to high power (~500 mW) for the photobleach. Beam scanning was performed with galvanometer (slow axis) and resonant (fast axis) mirrors. DCM=dichroic mirror, HWP=half-wave plate, PMT=photomultiplier tube, SPF=short-pass filter, TPEF=two-photon excited fluorescence. A tunable 80 MHz, Ti:sapphire, femtosecond laser (Mai Tai) purchased from Spectra-Physics (Santa Clara, CA) was used for the excitation source. The fundamental beam was raster-scanned across the sample using a 8.8 kHz resonant scanning mirror purchased from Electro-optical Products Corporation (Ridgewood, NY) for the fast-scan axis and a galvanometer mirror purchased from Cambridge-Tech (Bedford, MA) for the slow-scan axis, both controlled by custom timing electronics built in-house. A 10×, 0.3 NA objective purchased from Nikon (Melville, NY) was used to focus the beam onto the sample, and the TPEF signal was collected in the epi direction through the same objective used for delivery of the excitation beam. The laser was tuned to 800 nm with a power of ~50 mW at the sample during imaging and ~500 mW at the sample during photobleaching. A long-pass dichroic mirror (650DCXR) purchased from Chroma (Bellows Falls, VT) and a band-pass filter (FGS900) purchased from Thorlabs (Newton, NJ) were used to isolate the TPEF signal before it was detected by a photomultiplier tube (PMT) (H7422P-40 MOD) purchased from Hamamatsu (Hamamatsu City, Shizuoka, Japan). Responses of the PMT were digitized synchronously with the laser pulses by using a digital oscilloscope card (ATS9350) purchased from AlazarTech (Pointe-Claire, Québec, Canada) and mapped onto 512×512 images via custom software written in-house using MATLAB purchased from MathWorks (Natick, MA).(43) The TPEF videos were recorded at ~4 frames per second.

A simple change to the scan pattern of the galvanometer (slow axis) mirror was used to generate a comb photobleach pattern at the sample. Following an initial low-power period for baseline TPEF microscopy of the full field of view, patterned photobleaching was performed simply by changing the number of steps in the ramp function driving the galvanometer mirror from 512 (used for normal imaging) to an integer fraction of 512 corresponding to the fundamental spatial frequency (e.g. 8, 16, 32 pixels=$1/\bar{v}_0$). The dwell time per step was also increased proportionally such that the repetition rate of the slow axis mirror was independent of the number of lines in the comb photobleach pattern. A flip mount with a half-wave plate (depicted in FIG. 2) was synchronized to switch the excitation source from low power to high power concurrently with the reduction in ramp steps. This protocol resulted in a comb photobleach pattern as seen in FIG. 3A. After ~2 seconds at high power the flip mount was removed, reducing the laser power, and the number of steps for the slow axis mirror was changed back to 512 to facilitate normal imaging at low power to track the fluorescence recovery of the sample. A video of an FT-FRAP experiment on FITC-polydextran (2 MDa) in 22 mg/mL hyaluronic acid is shown in Supplemental Video 1, in which the microscope images are shown on the left and the log of the spatial FT is shown on the right.

Analysis of the FT-FRAP data was performed using custom software written in-house using MATLAB. A 2-dimensional FT was taken of each image. FT-FRAP curves were recovered by integrating over peaks in the FT magnitude. A fit was performed to recover the diffusion parameters using Eq. 14 for normal diffusion and Eq. 19 for anomalous diffusion. A MATLAB function written by Roberto Garrappa was used for evaluating the Mittag-Leffler function in Eq. 19.(44) Uncertainties in the fits were calculated based on the second derivative of $\chi^2$-space in the vicinity of the minimum. Phasor analysis of flow was performed by taking the argument of the complex-valued 2D-FT peaks and relating the phase back to flow velocity through Eq. 25.

3.4 Sample Preparation

Solutions of 2 mg/mL fluorescein isothiocyanate (FITC) polydextran (2 MDa) purchased from MilliporeSigma (Burlington, MA) were used to evaluate the FT-FRAP approach. These fluorescently labeled molecules were solubilized in either 50/50 glyercol/water or in an aqueous solution of 22 mg/mL hyaluronic acid (15 MDa) purchased from Lifecore Biomedical (Chaska, MN). Solutions were mixed thoroughly prior to FRAP analysis.

The capabilities of FT-FRAP were evaluated using polydextran, a model system for diffusion measurements. As shown in FIG. 3A, a comb pattern was employed for photobleaching a solution of 2 mg/mL FITC-polydextran (2 MDa) in 50/50 glycerol/water. Following photobleaching, spatial Fourier transformation produced sharp puncta with symmetric amplitudes about the origin peak as shown in FIG. 3B. As diffusion progressed, the FT peak intensities exhibited simple exponential decays, as shown in FIG. 3C. These observations are in excellent agreement with theoretical predictions in Eq. 4. Consistent with prior arguments on signal power, the FT-FRAP analysis provided high signal-to-noise photobleaching curves by combining the analysis over the entire field of view.

Referring to FIGS. 3A-3C, comb patterns for photobleaching enabled simultaneous analysis over multiple length scales through the nth spatial harmonics $\bar{v}_{x,n}$. Theoretical predictions in Eq. 14 suggest an exponential decay of each impulse with a decay constant given by $\tau=1/[4\pi^2(n\bar{v}_x^0)^2 D_{xx}]$. Higher harmonics are expected to exhibit faster decays with a quadratic dependence on n for normal diffusion. The decays of the first and second harmonic peaks were fit to Eq. 14, recovering a diffusion coefficient of 3.70±0.02 µm$^2$/s. The reported uncertainty is the standard deviation of the fit.

Figure 4:
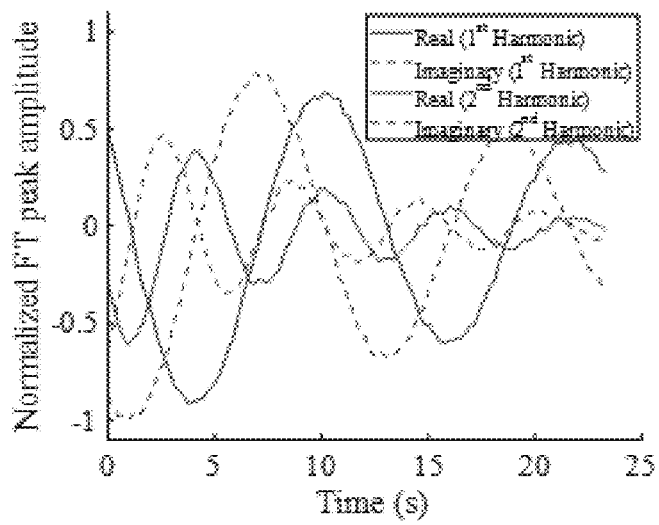
FIGS. 4A and 4B depict bulk flow measured by FT-FRAP of FITC-polydextran (2 MDa) in 50/50 glycerol/water. More particularly.
Figure 4:
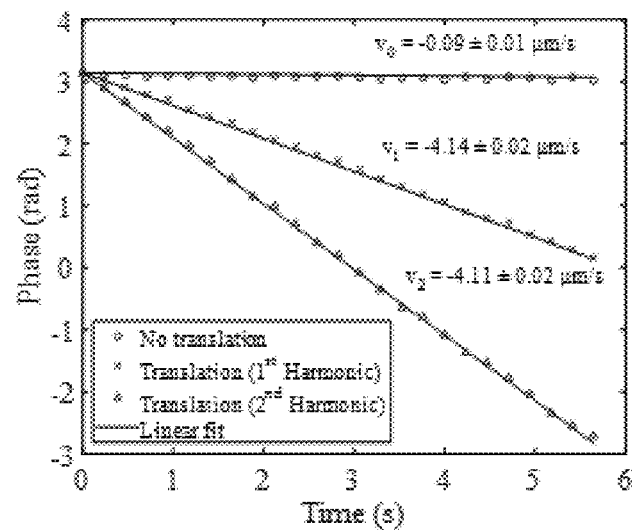

The impact of flow on the phase of the recovered Fourier transform peaks was evaluated in the results shown in FIGS. 4A-4B, in which unidirectional fluid motion was simulated by sample translation with an automated stage during the fluorescence recovery. The sample under investigation was an aqueous solution of 2 mg/mL FITC-polydextran (2 MDa) in 50/50 glycerol/water. Recovery of the diffusion coefficient in FT-FRAP only requires analysis of the magnitude of the Fourier peaks. However, the real and imaginary components of the Fourier peaks contain information about the spatial phase of the photobleach pattern. FIG. 4A shows an oscillatory decay of the real and imaginary components of the first and second harmonic peaks. The phase of the Fourier peak can be calculated using the argument of the complex number describing the peak at each time point. FIG. 4B shows the phase shift of a sample that was not translated and the phase shift of the first and second harmonic peaks of a sample that was translated. Consistent with the expression in Eq. 25, the phase angle changed linearly with time for the system undergoing directional translation in the x-direction of the photobleach comb, with a proportionality constant of $2\pi n \bar{v}_x^0 q_x$. Consequently, the nth harmonic is predicted to exhibit an n-fold increase in the rate of phase angle change over time relative to the fundamental peak. From the results summarized in FIG. 4B, precisely this trend was observed in the measurements, in excellent agreement with the theoretical predictions. The measured flow rate for the translated sample (4.14±0.02 µm/s; uncertainty is the standard deviation of the fit) matched the measured translation rate of the sample stage (4.0±0.4 µm/s; uncertainty is the standard deviation of three measurements).

Interestingly, a statistically significant flow of 0.09±0.01 µm/s was observed even in the absence of sample translation. This subtle but nonzero flow is attributed to slow sample convection within the viscous 50/50 glycerol/water solvent. The sensitivity of phase analysis is noteworthy, as this flow is >40 times slower than the sample translation and corresponds to a displacement of approximately 1-2 pixels (2 µm) over the entire 25 seconds of data collection. It should be noted that flow (in the absence of mixing) only changes the phase of the FT peak and not the magnitude. Phase changes are independent of the magnitude and do not influence the fluorescence recovery curve.

It is worthwhile to compare the FT-FRAP approach demonstrated herein with previous studies employing spatial Fourier analysis (SFA) of FRAP measurements. In those prior studies, Fourier analysis was performed to aid in interpretation of recoveries using conventional photobleach illumination of localized points. SFA provided similar computational benefits in the mathematical simplicity arising in the Fourier domain. However, FT-FRAP has a major signal-to-noise advantage over conventional point-illumination. In the numerator, FT-FRAP supports major increases in the signal power (>2000-fold with comb illumination) by distributing the photobleach amplitude over the entire field of view, whereas conventional point-illumination saturates (photobleach depth approaching unity) at a much lower integrated signal power. Furthermore, patterned illumination enables shifting of the signal to a quiet spatial frequency for noise suppression. By analogy with 1/f noise in electronics, analysis of natural images suggests a power spectrum obeying a $1/\bar{\nu}$ dependence.(45) For optical detection in the shot-noise limit, the variance in signal is proportional to the mean. Since visible photons are often detectable with signal-to-noise approaching the shot-noise limit in instrumentation optimized for FRAP, it stands to reason that the noise in the Fourier domain will also scale with the signal power in an image with natural contrast. Consequently, the low frequency noise power spectrum is also expected to scale with $1/\bar{\nu}$, in direct analogy with 1/f noise in electronics. As in electronics, shifting of the signal to a frequency regime with lower noise through modulation can provide a substantial noise reduction.

The illumination patterns investigated in this work were specifically designed for spatial Fourier transform analysis and as such differ significantly from a host of previous FRAP studies using patterned illumination. Previous work investigated the use of arbitrary photobleach patterns to select objects or regions of interest within the field of view. Alternatively, several investigators have explored measurements with line-excitation. However, none of these previous patterned illumination studies incorporated intentional periodicity within the photobleach patterns that could subsequently integrate into FT-FRAP analysis. Control over the number of lines within the comb provides the advantage of matching the distances over which diffusion is measured, and correspondingly the timeframe for recovery. Under high magnification, the field of view is reduced, which can be compensated by reducing the number of lines within the patterned photobleach. Conversely, measurement time can be reduced to improve throughput by increasing the number of lines in the photobleach pattern to reduce the diffusion distances in the comb. The closest work to the present study is arguably in early studies by Lanni and Ware, in which sinusoidal modulation of a photobleach pattern was performed by passing the excitation beam through a grating. (49) The apparatus was designed so that the image of the grating was at the focus of the sample, creating a photobleaching mask at high laser power. The subsequent fluorescence recovery was probed by translating the grating, producing a phase shift in the illumination pattern at the sample, which generated a periodic signal in the integrated fluorescence intensity over time as the grating was shifted. The integrated fluorescence signal was recorded on a single-channel detector and the Fourier components were analyzed to recover the diffusion coefficient. The conceptual foundation for the studies by Lanni and Ware is aligned with the principles undergirding the work presented herein. The difference lies in the tools that were used to realize the FT-FRAP measurement. Laser-scanning microscopy makes FT-FRAP a faster, higher SNR, measurement than similar techniques with different tools from decades ago.

Figure 5:
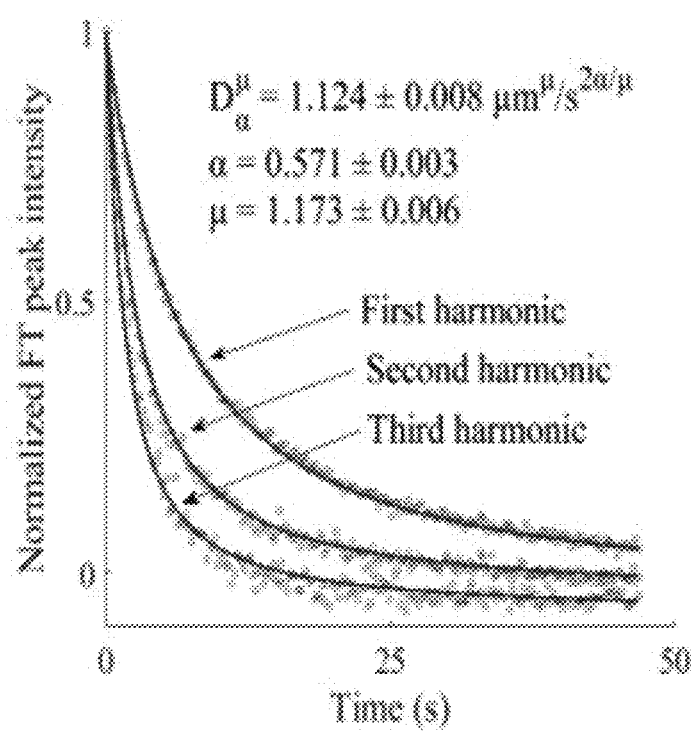
FIG. 5 depicts a harmonic analysis of anomalous diffusion with FITC-polydextran (2 MDa) in 22 mg/mL hyaluronic acid. Fluorescence recovery of the first, second, and third harmonics are fit to a modified Mittag-Leffler function to recover the anomalous diffusion coefficient, D=1.124±0.008 $\mu m^\mu/s^{2\alpha/\mu}$, the subdiffusion parameter, $\alpha$=0.571±0.003, and the Lévy flight parameter, $\mu$=1.173±0.006. The recovered parameters reveal subdiffusive and Lévy flight behavior in the sample. The reported uncertainties are the standard deviations in the fit.

Additional results were obtained to characterize anomalous diffusion in a viscous matrix. FIG. 5 shows FT-FRAP with a comb photobleach pattern on FITC-polydextran (2 MDa) in 22 mg/mL hyaluronic acid (HA), which (HA) is a glycosaminoglycan polymer that is found throughout the connective tissues of the body. The physiological functions in which HA is involved include lubrication, wound repair, and cell migration. HA is known to increase viscosity when added to aqueous solution. In this experiment, the fluorescence recovery of the first three spatial harmonics of the comb photobleach pattern was analyzed to characterize anomalous diffusion of FITC-polydextran in a solution with HA.

Several models for anomalous diffusion were considered. First, the three harmonics were fit to a model for systems with subdiffusive mobility, described in Eq. 16. Subdiffusion was considered because of possible binding and unbinding or association and dissociation of the FITC-polydextran with the HA matrix. However, analysis with this model did not produce a satisfactory fit because the data did not exhibit a quadratic dependence on spatial frequency. Second, the data were fit to a model for systems exhibiting Lévy flight, described in Eq. 18. Lévy flight behavior was considered because of possible crowding or trapping by HA acting as an obstacle to constrict free diffusion of the FITC-polydextran. While the Levy flight model produced best-fit curves with a better match for the spatial frequency dependence, the shape of the best-fit curves was exponential and far from a good fit to the fluorescence recovery curves. Models incorporating just one of these two effects (subdiffusion and Levy flight) were insufficient to describe the data.

Third, a global fit of the first three harmonics to a combined subdiffusion-Lévy flight model, described in Eq. 19, was performed to recover the anomalous diffusion coefficient D=1.124±0.008 µm/s2α/µ, the subdiffusive parameter α=0.571±0.003, and the Lévy flight parameter µ=1.173±0.006. The reported uncertainties are the standard deviations in the fit. The result of this fit is shown in FIG. 5. The combined model was able to account for both the spatial frequency dependence of the harmonics and the shape of the recovery curves, which deviates from exponential. The value of α<1 indicates that the characteristic wait time diverges (subdiffusion). Furthermore, the value for µ<2 indicates that the step length variance diverges (Lévy flight).

The results of the analysis demonstrate that FT-FRAP can sensitively and precisely disentangle covariant parameters describing anomalous diffusion by simultaneously fitting to multiple harmonics acquired in parallel. The same analysis performed with only the first harmonic yields lower confidence in the recovered parameters: D=1.9±0.1 µmµ/s2α/µ, α=0.69±0.01, and µ=1.57±0.05. The reduction in precision likely arises from the increase in covariance in the single-harmonic fit; the recovered parameters are highly correlated (D & α=0.976, D & µ=0.995, and α & µ=0.993, where ±1 corresponds to perfectly correlated/anti-correlated parameters). By comparison, the correlation coefficients obtained in the three-harmonic fit are much less significant: D & α=−0.204, D & µ=0.286, and α & µ=0.850. Comparison with a one-harmonic fit demonstrates that measuring diffusion at multiple length scales with FT-FRAP can substantially increase statistical confidence in the parameters recovered from fitting to an anomalous diffusion model by constraining the model to describe diffusion globally.

In conclusion, FT-FRAP with patterned illumination has been described theoretically and demonstrated experimentally to characterize normal and anomalous diffusion. Relative to conventional point-bleach FRAP, FT-FRAP has the advantages of mathematical simplicity, higher SNR, representative sampling, and multi-photon compatibility. Proof-of-concept measurements with a model system (FITC-polydextran) showed good agreement with theory. Flow was quantified using the phase of the real and imaginary components of the FT peaks. Anomalous diffusion was characterized by FT-FRAP through a global fit to multiple harmonics of the photobleach pattern.

Future fundamental work could include experiments to test the ability of FT-FRAP with patterned illumination to characterize heterogeneous samples, where diffusion varies across the field of view. In such cases, point illumination could inform on the localized diffusion recorded in the isolated region adjacent to the photobleach. In contrast, patterned illumination simultaneously interrogates diffusion within the entire field of view. In samples exhibiting heterogeneous diffusivity, the integrated heights of the FT peaks recover the average diffusion coefficient throughout the field of view. In principle, the shape of the FT peak can further inform on the spatial diversity in diffusion, which is currently under investigation for recovery of diffusivity maps. FT-FRAP can also be implemented in a variety of application spaces including measurement of mobility in pharmaceutically relevant matrices, quantification of protein aggregation, and live-cell imaging.

Specific embodiments provided herein can further include any one or more of the following numbered paragraphs:
1. A method for measuring diffusion in a medium, wherein the method comprises: dissolving a fluorescent sample into the medium; imaging the fluorescent sample with a patterned illumination Fluorescence Recovery After Photobleaching (FRAP) technique, wherein the imaging the fluorescent sample with the patterned illumination FRAP technique comprises: recording images of a dissolved fluorescent sample into the medium; photobleaching the dissolved fluorescent sample using a patterned illumination with a laser, wherein the patterned illumination comprises at least one of periodic patterned illumination or repeating patterned illumination; and recording images of a photobleached dissolved fluorescent sample with the patterned illumination; analyzing a set of microscope images of the photobleached dissolved fluorescent sample with the patterned illumination using a Fourier Transform (FT) FRAP technique, wherein the analyzing the set of microscope images of the photobleached dissolved fluorescent sample with the patterned illumination using the FT FRAP technique comprises: performing a two-dimensional spatial Fourier transform on the set of microscope images; fitting at least one Fourier transform peak to a diffusion model, thereby producing a fitted curve; and calculating diffusion properties of the fitted curve.
2. The method of paragraph 1, wherein the laser has power ranging from 300 milliwatts (mW) to 500 milliwatts (mW).
3. The method of paragraphs 1 or 2, wherein using the patterned illumination with the laser comprises: using patterned laser beam scanning; or using diffractive optical elements.
4. The method according to any paragraph 1 to 3, wherein the at least one Fourier peak corresponds to a frequency of the patterned illumination.
5. The method according to any paragraph 1 to 4, wherein the diffusion model comprises Fick's Law of Diffusion model or continuous-time random walk fractional diffusion model.
6. The method according to any paragraph 1 to 5, wherein the fitting the at least one Fourier transform peak to the diffusion model, thereby producing the fitted curve comprises fitting the at least one Fourier transform peak to the diffusion model using a least-squares methodology, thereby producing the fitted curve.
7. The method according to any paragraph 1 to 6, wherein the diffusion properties comprises at least one of diffusion coefficient, recoverable fraction, subdiffusive exponent, or Lévy flight exponent.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof is determined by the claims that follow.

What is claimed is:
1. A method for measuring diffusion in a medium, comprising:
dissolving FITC-polydextran into the medium;
imaging the FITC-polydextran with a patterned illumination Fluorescence Recovery After Photobleaching (FRAP) technique, wherein the imaging the FITC-polydextran with the patterned illumination FRAP technique comprises:

recording images of a dissolved FITC-polydextran into the medium;

photobleaching the dissolved FITC-polydextran using a patterned illumination with a laser, wherein the patterned illumination comprises at least one of periodic patterned illumination or repeating patterned illumination; and recording images of a photobleached dissolved FITC-polydextran with the patterned illumination;

analyzing a set of microscope images of the photobleached dissolved FITC-polydextran with the patterned illumination using a Fourier Transform (FT) FRAP technique, wherein the analyzing the set of microscope images of the photobleached dissolved FITC-polydextran with the patterned illumination using the FT FRAP technique comprises:

performing a two-dimensional spatial Fourier transform on the set of microscope images;

fitting at least one Fourier transform peak to a diffusion model, thereby producing a fitted curve; and calculating diffusion properties of the fitted curve.

2. The method of claim 1, wherein the laser has power ranging from 300 milliwatts (mW) to 500 milliwatts (mW).

3. The method of claim 1, wherein the using the patterned illumination with the laser comprises using patterned laser beam scanning; or using diffractive optical elements.

4. The method of claim 1, wherein the at least one Fourier peak corresponds to a frequency of the patterned illumination.

5. The method of claim 1, wherein the diffusion model comprises Fick's Law of Diffusion model or continuous-time random walk fractional diffusion model.

6. The method of claim 1, wherein the fitting the at least one Fourier transform peak to the diffusion model, thereby producing the fitted curve comprises fitting the at least one Fourier transform peak to the diffusion model using a least-squares methodology, thereby producing the fitted curve.

7. The method of claim 1, wherein the diffusion properties comprises at least one of diffusion coefficient, recoverable fraction, subdiffusive exponent, or Lévy flight exponent.

8. A method for measuring diffusion in a medium, comprising:

dissolving a fluorescent sample into a medium comprising a 50/50 glyercol/water mixture, aqueous solution of 22 mg/mL hyaluronic acid or both;

imaging the fluorescent sample with a patterned illumination Fluorescence Recovery After Photobleaching (FRAP) technique, wherein the imaging the fluorescent sample with the patterned illumination FRAP technique comprises:

recording images of a dissolved fluorescent sample into the medium comprising a 50/50 glyercol/water mixture, aqueous solution of 22 mg/mL hyaluronic acid or both;

photobleaching the dissolved fluorescent sample using a patterned illumination with a laser, wherein the patterned illumination comprises at least one of periodic patterned illumination or repeating patterned illumination; and recording images of a photobleached dissolved fluorescent sample with the patterned illumination;

analyzing a set of microscope images of the photobleached dissolved fluorescent sample with the patterned illumination using a Fourier Transform (FT) FRAP technique, wherein the analyzing the set of microscope images of the photobleached dissolved fluorescent sample with the patterned illumination using the FT FRAP technique comprises:

performing a two-dimensional spatial Fourier transform on the set of microscope images;

fitting at least one Fourier transform peak to a diffusion model, thereby producing a fitted curve; and calculating diffusion properties of the fitted curve.

9. The method of claim 8, wherein the laser has power ranging from 300 milliwatts (mW) to 500 milliwatts (mW).

10. The method of claim 8, wherein the using the patterned illumination with the laser comprises using patterned laser beam scanning; or using diffractive optical elements.

11. The method of claim 8, wherein the at least one Fourier peak corresponds to a frequency of the patterned illumination.

12. The method of claim 8, wherein the diffusion model comprises Fick's Law of Diffusion model or continuous-time random walk fractional diffusion model.

13. The method of claim 8, wherein the fitting the at least one Fourier transform peak to the diffusion model, thereby producing the fitted curve comprises fitting the at least one Fourier transform peak to the diffusion model using a least-squares methodology, thereby producing the fitted curve.

14. The method of claim 8, wherein the diffusion properties comprises at least one of diffusion coefficient, recoverable fraction, subdiffusive exponent, or Lévy flight exponent.

15. A method for measuring diffusion in a medium, comprising:

dissolving FITC-polydextran into a medium comprising a 50/50 glyercol/water mixture, aqueous solution of 22 mg/mL hyaluronic acid or both;

imaging the FITC-polydextran with a patterned illumination Fluorescence Recovery After Photobleaching (FRAP) technique, wherein the imaging the FITC-polydextran with the patterned illumination FRAP technique comprises:

recording images of a dissolved FITC-polydextran into the mixture medium comprising a 50/50 glyercol/water mixture, aqueous solution of 22 mg/mL hyaluronic acid or both;

photobleaching the dissolved FITC-polydextran using a patterned illumination with a laser, wherein the patterned illumination comprises at least one of periodic patterned illumination or repeating patterned illumination; and recording images of a photobleached dissolved FITC-polydextran with the patterned illumination;

analyzing a set of microscope images of the photobleached dissolved FITC-polydextran with the patterned illumination using a Fourier Transform (FT) FRAP technique, wherein the analyzing the set of microscope images of the photobleached dissolved FITC-polydextran with the patterned illumination using the FT FRAP technique comprises:

performing a two-dimensional spatial Fourier transform on the set of microscope images;

fitting at least one Fourier transform peak to a diffusion model, thereby producing a fitted curve; and calculating diffusion properties of the fitted curve.

16. The method of claim 15, wherein the laser has power ranging from 300 milliwatts (mW) to 500 milliwatts (mW).

17. The method of claim 15, wherein the using the patterned illumination with the laser comprises using patterned laser beam scanning; or using diffractive optical elements.

18. The method of claim 15, wherein the at least one Fourier peak corresponds to a frequency of the patterned illumination.

19. The method of claim 15, wherein the diffusion model comprises Fick's Law of Diffusion model or continuous-time random walk fractional diffusion model and the diffusion properties comprises at least one of diffusion coefficient, recoverable fraction, subdiffusive exponent, or Lévy flight exponent.

20. The method of claim 15, wherein the fitting the at least one Fourier transform peak to the diffusion model, thereby producing the fitted curve comprises fitting the at least one Fourier transform peak to the diffusion model using a least-squares methodology, thereby producing the fitted curve.

* * * * *